United States Patent
Chen et al.

(10) Patent No.: US 12,279,321 B2
(45) Date of Patent: Apr. 15, 2025

(54) BEARER RECONFIGURATION FOR SCG ACTIVATION/DEACTIVATION

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Haijing Hu, Los Gatos, CA (US); Naveen Kumar R. Palle Venkata, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,738

(22) PCT Filed: May 10, 2021

(86) PCT No.: PCT/CN2021/092802
§ 371 (c)(1),
(2) Date: May 6, 2022

(87) PCT Pub. No.: WO2022/236589
PCT Pub. Date: Nov. 17, 2022

(65) Prior Publication Data
US 2024/0155712 A1     May 9, 2024

(51) Int. Cl.
*H04W 76/15*      (2018.01)
*H04W 76/19*      (2018.01)
*H04W 76/20*      (2018.01)

(52) U.S. Cl.
CPC ........... *H04W 76/15* (2018.02); *H04W 76/19* (2018.02); *H04W 76/20* (2018.02)

(58) Field of Classification Search
CPC ..... H04W 76/15; H04W 76/19; H04W 76/20; H04W 76/12; H04W 76/34
See application file for complete search history.

(56) References Cited

U.S. PATENT DOCUMENTS

2019/0053199 A1    2/2019  Fujishiro et al.
2019/0380070 A1*  12/2019  Lee .................. H04W 36/0072
(Continued)

FOREIGN PATENT DOCUMENTS

| CN | 112584550 | 3/2021 |
| WO | 2020/167170 | 8/2020 |
| WO | 2021/026906 | 2/2021 |

OTHER PUBLICATIONS

Interdigital Inc., "On Support of Activation/Deactivation for SCG," 3GPP RAN WG2 Meeting #112-e Electronic, Nov. 2-13, 2020, R2-2009259, pp. 1-4 (Year: 2020).*
(Continued)

*Primary Examiner* — Un C Cho
*Assistant Examiner* — Lalita W Pace
(74) *Attorney, Agent, or Firm* — Fay Kaplun & Marcin, LLP

(57) ABSTRACT

A user equipment (UE) is configured to receive, from a base station of a wireless network, a deactivation indication indicating that a secondary cell group (SCG) of a dual connectivity (DC) wireless communications configuration has been deactivated, receive, from the base station, a remapping indication indicating that SCG data originally mapped to an SCG bearer should be remapped to an alternate bearer, remap the SCG data to the alternate bearer based on the remapping indication and transmit data over the alternate bearer.

18 Claims, 7 Drawing Sheets

(56) References Cited

U.S. PATENT DOCUMENTS

2022/0394583 A1* 12/2022 Deenoo ............. H04W 74/0841
2023/0048183 A1* 2/2023 Xu ....................... H04W 76/30

OTHER PUBLICATIONS

Oppo, "Discussion on SCG Suspension or deactivation," 3GPP-TSG RAN WG2 Meeting #112—Electronic Online, Nov. 2-13, 2020, R2-2008870 (revision of R2-2006806), pp. 1-10 (Year: 2020).*
Vivo, "Activation and deactivation mechanism for SCG and SCells," 3GPP-TSG RAN WG2 Meeting #112 electronic Online, Nov. 2-13, 2020, R2-2010290, pp. 1-7 (Year: 2020).*
ZTE et al., "Framework of SCG deactivation and activation," 3GPP TSG-RAN WG2 Meeting #111 electronic e-meeting, Aug. 17-28, 2020, R2-2006900, pp. 1-6 (Year: 2020).*
3GPP TS 37.340 V15.12.0 (Mar. 2021); 3rd Generation Partnership Project; Technical Specification Group Radio Access Network; Evolved Universal Terrestrial Radio Access (E-UTRA) and NR; Multi-connectivity; Stage 2 (Year: 2021).*
Nokia et al., "Detecting inactivity of UE with split bearer"; 3GPP TSG-RAN WG3 NR ad-hoc meeting #2; R3-172073; Jun. 19, 2017; 2 sheets.
Nokia et al., "On fast deactivation/activation of SCG", 3GPP TSG-RAN WG2 Meeting #112 Electronic, Oct. 23, 2020, R2-2009547, 7 sheets.
InterDigital "Activation and Deactivation of SCG", 3GPP RAN WG2 Meeting #113-bis-e, Apr. 1, 2021, R2-2103681, 5 sheets.
Vivo "UE behavior when SCG is deactivated", 3GPP TSG-RAN WG2 Meeting #113bis electronic, Apr. 2, 2021, R2-2102872, 9 sheets.

* cited by examiner

BEARER RECONFIGURATION FOR SCG ACTIVATION/DEACTIVATION

BACKGROUND

In 5G new radio (NR) wireless communications using dual connectivity (DC), there are various types of bearers including a primary cell group (PCG) bearer, a secondary cell group (SCG) bearer, and a split (PCG/SCG) bearer. In 5G NR DC, a first next generation NodeB (gNB) serves as the primary node (PN) and a second gNB serves as the secondary node (SN).

SUMMARY

Some exemplary embodiments are related to a processor of a user equipment (UE) configured to perform operations. The operations include receiving, from a base station of a wireless network, a deactivation indication indicating that a secondary cell group (SCG) of a dual connectivity (DC) wireless communications configuration has been deactivated, receiving, from the base station, a remapping indication indicating that SCG data originally mapped to an SCG bearer should be remapped to an alternate bearer, remapping the SCG data to the alternate bearer based on the remapping indication and transmitting data over the alternate bearer.

Other exemplary embodiments are related to a processor of a base station configured to perform operations. The operations include transmitting, to a user equipment (UE), a deactivation indication indicating that a secondary cell group (SCG) of a dual connectivity (DC) wireless communications configuration has been deactivated, transmitting, to the UE, a remapping indication indicating that SCG data originally mapped to an SCG bearer should be remapped to an alternate bearer, remapping the SCG data to the alternate bearer and transmitting data over the alternate bearer.

DETAILED DESCRIPTION

Figure 1:
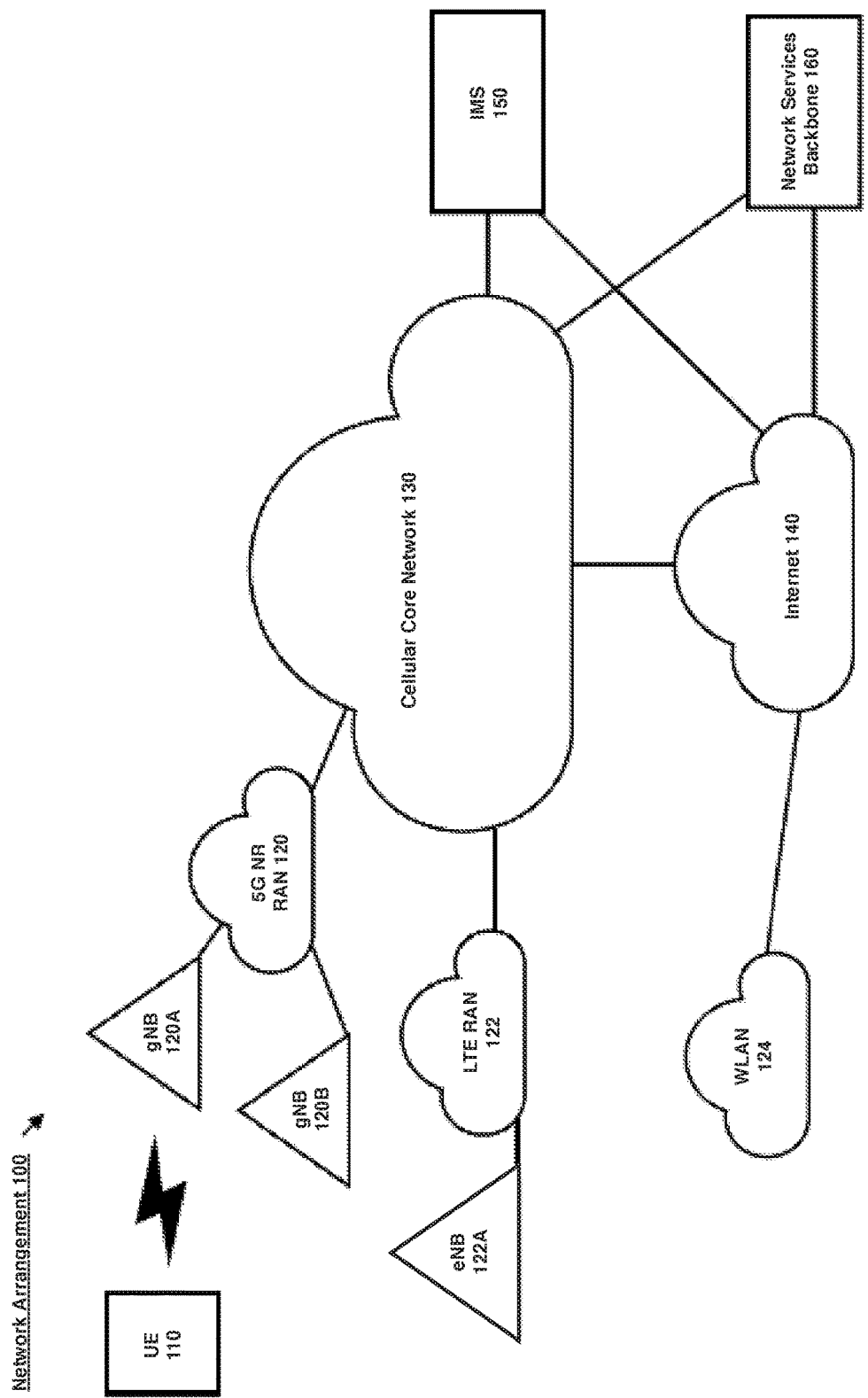
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) being configured with how to handle data radio bearers (DRBs) upon activation/deactivation of a secondary cell group (SCG) in a dual connectivity (DC) environment.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

As noted above, in DC, a primary cell group (PCG) bearer, a secondary cell group (SCG) bearer, and a split bearer may carry data to the UE. When the amount of data exchanged between the network and the UE reaches an amount where the SCG is no longer needed or if the quality of the signal between the UE and the SCG has degraded, the network may deactivate the SCG. However, current 3GPP standards do not specify how the SCG bearer and the SCG leg of the split bearer are handled upon deactivation of the SCG.

According to exemplary embodiments, upon deactivation of the SCG, the network and the UE cease transmissions over the SCG bearer and the SCG leg of the split bearer and only transmit over a primary cell group (PCG) bearer and the PCG leg of the split bearer. Once a predetermined criteria is met, the SCG may be reactivated.

According to other exemplary embodiments, upon deactivation of the SCG, the network may remap the SCG bearer to another bearer (PCG bearer or split bearer). Once a predetermined criteria is met, the SCG may be reactivated and new data may be remapped to the SCG bearer.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
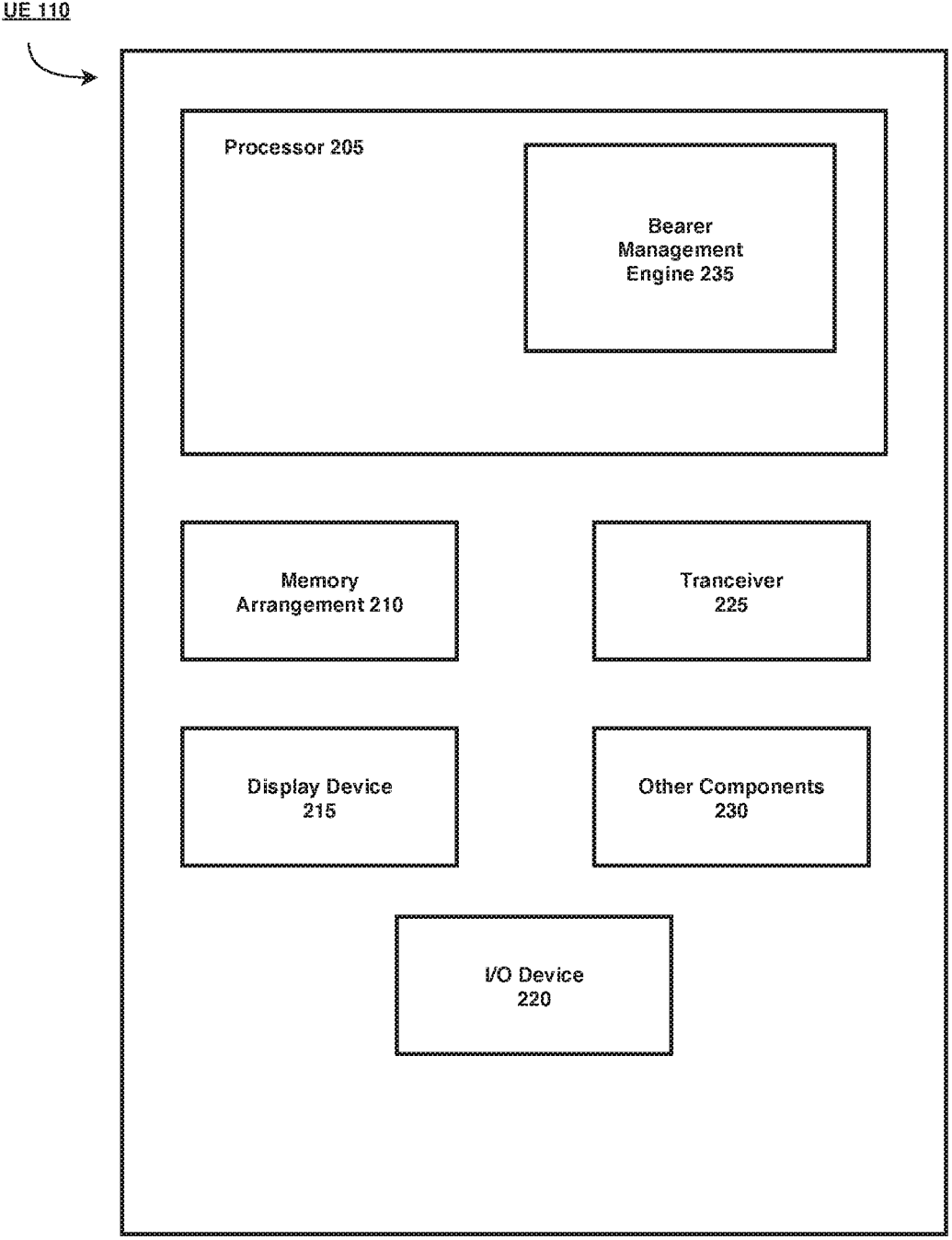
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a bearer management engine 235. The bearer management engine 235 may perform various operations related to ceasing transmission on an SCG bearer when instructed by the network and remapping the SCG bearer to another bearer as configured by the network, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
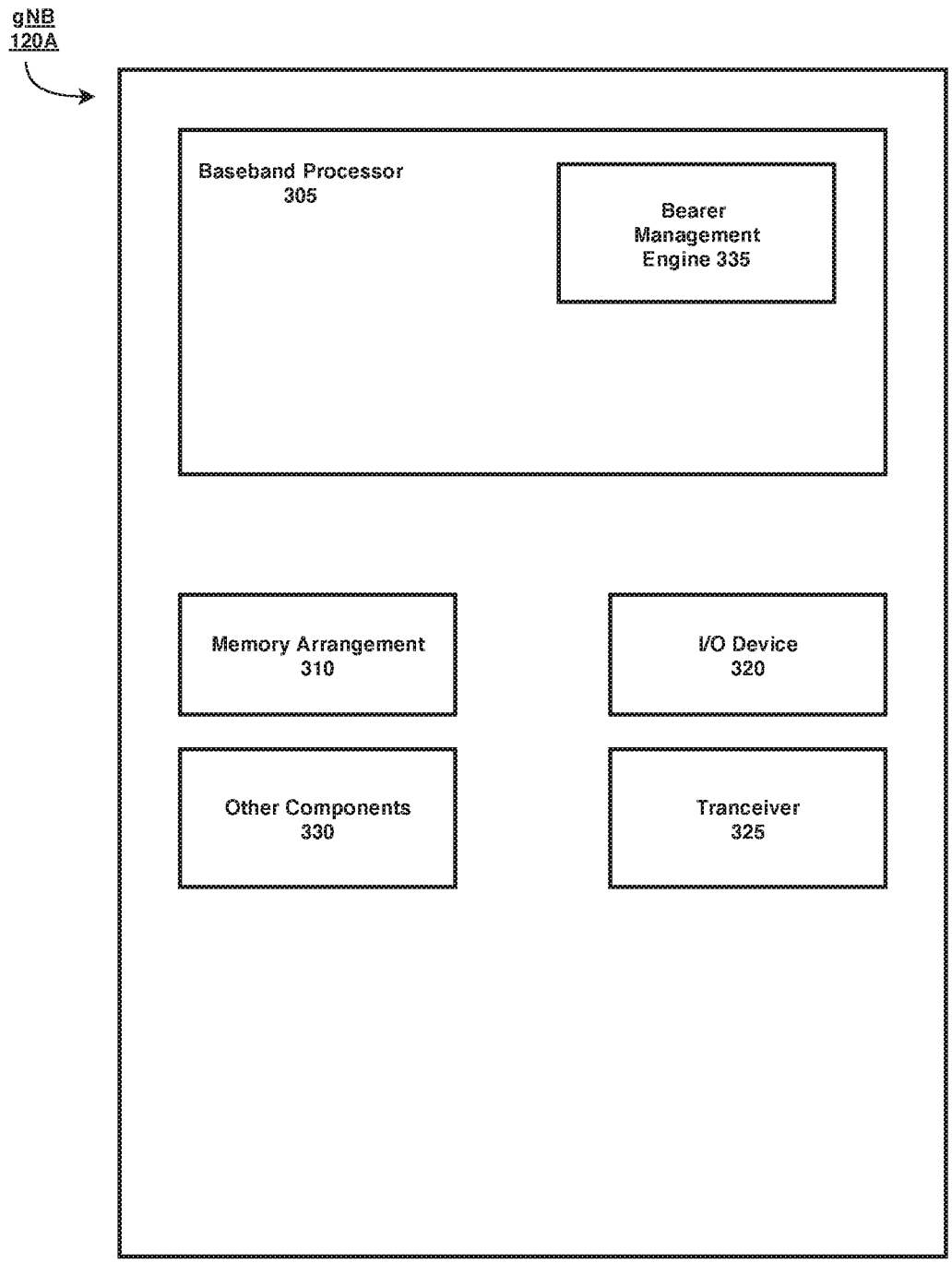
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a bearer management engine 335 for performing operations including activating and deactivating an SCG bearer and remapping the SCG bearer to another bearer. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
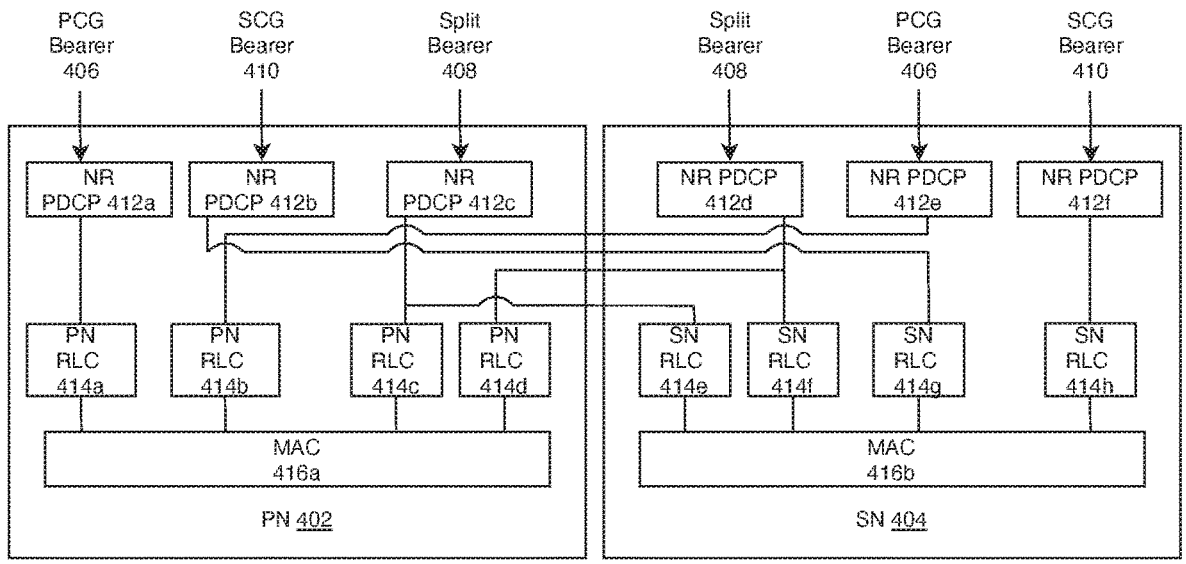
FIG. 4 shows an exemplary network architecture for facilitating dual connectivity (DC) wireless communications according to various exemplary embodiments.

FIG. 4 shows an exemplary network architecture 400 for facilitating dual connectivity (DC) wireless communications according to various exemplary embodiments. In some embodiments, the network architecture includes a primary node (PN) 402 (e.g., gNB 120A) and a secondary node (SN) 404 (e.g., gNB 120B). As illustrated in FIG. 4, a PCG bearer 406, a split bearer 408, and an SCG bearer 410 may be used by the network 120 for transmissions to the UE 110 in DC. The PN 402 includes first, second and third NR packet data convergence protocol (PDCP) layers 412a-c corresponding to the PCG bearer 406, the SCG bearer 410, and the PCG leg of the split bearer 408, respectively. The PN 402 also includes first, second, third, and fourth PN radio link control (RLC) layers 414a-d and a medium access control (MAC) layer 416a that serves all of the PN RLC layers 414a-d. The SN 404 includes first, second, and third NR PDCP layers 412d-f corresponding to the SCG leg of the split bearer 408, the PCG bearer 406, and the SCG bearer 410, respectively. The SN 404 also includes fifth, sixth, seventh, and eighth SN RLC layers 414e-h and a MAC layer 416b that serves all of the SN RLC layers 414e-h.

The PDCP layers 412a-f may process requests from and provide indications to one or more radio resource control (RRC) layers (not shown) and/or one or more service data adaptation protocol (SDAP) layers (not shown). These requests and indications may comprise one or more radio bearers (e.g., PCG bearer 406, split bearer 408, SCG bearer 410). The PDCP layers 412a-f may execute header compression and decompression of internet protocol (IP) data, maintain PDCP sequence numbers (SNs), perform in-sequence delivery of upper layer protocol data units (PDUs) at re-establishment of lower layers, eliminate duplicates of lower layer service data units (SDUs) at re-establishment of lower layers for radio bearers mapped on RLC acknowledgement mode (AM), cipher and decipher control plane data, perform integrity protection and integrity verification of control plane data, control timer-based discard of data, and perform security operations.

The RLC layers 414a-h may process requests from and provide indications to the PDCP layers 412a-f. The RLC layers 414a-h may operate in a plurality of modes of operation, including AM, Transparent Mode (TM), and Unacknowledged Mode (UM). The RLC layers 414a-h may execute transfer of upper layer PDUs, error correction through automatic repeat request (ARQ) for AM data transfers, and concatenation, segmentation and reassembly of RLC SDUs for UM and AM data transfers. The RLC layers 414a-h may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The MAC layers 416a,b may process requests from, and provide indications to, the RLC layers 414a-d. The MAC layers 416a,b may perform mapping between the logical channels and transport channels, multiplexing of MAC SDUs from one or more logical channels onto transport blocks (TBs) to be delivered to a physical layer (not shown) via the transport channels, de-multiplexing MAC SDUs to one or more logical channels from TBs delivered from the physical layer via transport channels, multiplexing MAC SDUs onto TBs, scheduling information reporting, error correction through hybrid ARQ (HARQ), and logical channel prioritization.

Figure 5:
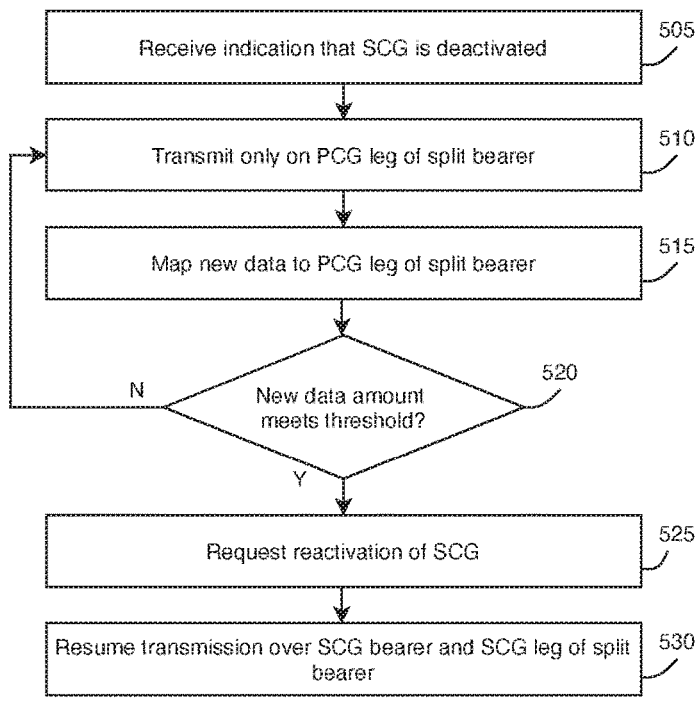
FIG. 5 shows a method of handling a secondary cell group (SCG) leg of a split bearer upon deactivation of the SCG according to various exemplary embodiments.

FIG. 5 shows a method 500 of handling an SCG leg of the split bearer 408 upon deactivation of the SCG according to various exemplary embodiments. At 505, the UE 110 receives an indication from the network (e.g., gNB 120A) that the SCG has been deactivated. In some embodiments, this indication may be provided in an RRC reconfiguration message. At 510, the UE 110 (and the network 120) only sends transmissions on the PCG leg of the split bearer 408 (in addition to the PCG bearer 406). At 515, when new data is generated, the new data is mapped to the PCG leg of the split bearer 408 (in addition to the PCG bearer 406). At 520, the UE 110 determines if the new data amount meets/exceeds a predetermined threshold. In some embodiments, the predetermined threshold is on a per split bearer basis. In some embodiments, the predetermined threshold is alternatively for an accumulated new data amount for all split bearers.

If the new data amount is less than the predetermined threshold, the method 500 returns to 510, where transmissions are only carried out on the PCG leg of the split bearer 408. However, if the new data amount meets/exceeds the predetermined threshold, at 525, the UE 110 transmits a request to the network 120 that the SCG be reactivated so that the network 120 can perform this reactivation.

At 530, the UE 110 (and network 120) resumes transmissions over the SCG bearer 410 and the SCG leg of the split bearer 408. In some embodiments, the network 120 may configure which leg of the split bearer 408 is the primary leg in the transmission sent to the UE 110 reactivating the SCG. It should be noted that the operations of method 500 may be performed by the UE 110, as explained above, or by the network 120 (e.g., gNB 120A). However, if the network 120 performs the operations of the method 500, the network 120 may autonomously reactivate the SCG at 525 without a request from the UE 110.

Figure 6:
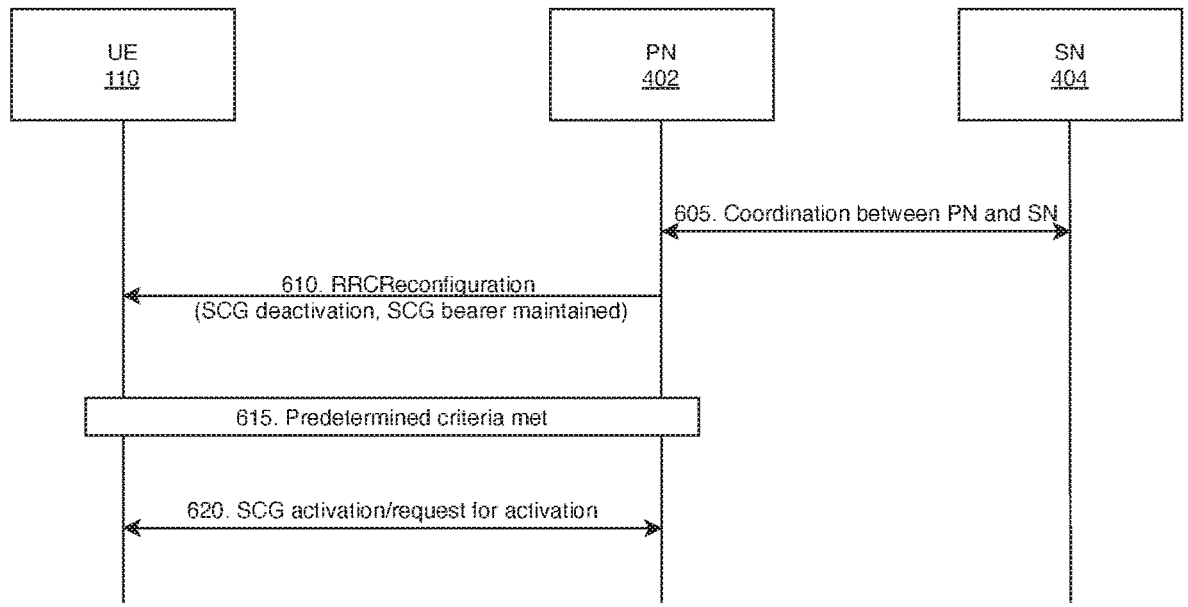
FIG. 6 shows a signaling diagram for deactivation and activation of an SCG according to various exemplary embodiments.

FIG. 6 shows a signaling diagram for deactivation and activation of an SCG according to various exemplary embodiments. At 605, coordination between the PN 402 and the SN 404 occurs. At 610, the PN 402 transmits an RRCReconfiguration message to the UE 110 to notify the UE 110 that the SCG has been deactivated and to configure the UE 110 to maintain the SCG bearer 410. That is, new data generation is allowed for the SCG bearer 410 although transmission over this bearer is ceased.

At 615, a predetermined criteria for SCG reactivation is met. On the network side, in some embodiments, the predetermined criteria may be a threshold for the total amount of new downlink data accumulated on all SCG bearers. In some embodiments, the predetermined criteria may alternatively be a threshold for the amount of new downlink data on any SCG bearer. In some embodiments, the predetermined criteria may alternatively be the expiration of a timer. On the UE side, in some embodiments, the predetermined criteria may be a threshold for the total amount of new uplink data accumulated on all SCG bearers. In some embodiments, the predetermined criteria may alternatively be a threshold for the amount of new uplink data on any SCG bearer. In some embodiments, the predetermined criteria may alternatively be the expiration of a timer. In such an embodiment, the timer may be configured by the network or defined by 3GPP standards.

At 620, if the network 120 determines that the predetermined criteria is met, the network reactivates the SCG. If the UE 110 determines that the predetermined criteria is met, the UE 110 transmits a request to the network to reactivate the SCG. After reactivation of the SCG, transmission on the SCG bearer 410 may begin again.

Figure 7:
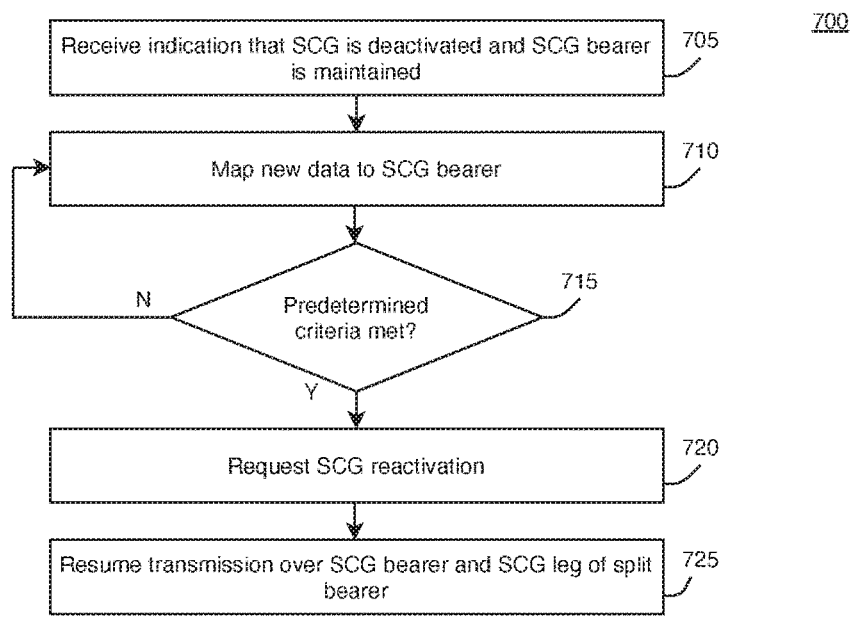
FIG. 7 shows a method of handling an SCG bearer upon deactivation of the SCG according to various exemplary embodiments.

FIG. 7 shows a method 700 of handling the SCG bearer 410 upon deactivation of the SCG according to various exemplary embodiments. The method 700 relates to the signaling diagram of FIG. 6. As such, a description of elements described above with respect to FIG. 6 will be omitted here. At 705, the UE 110 receives an indication from the network 120 that the SCG is deactivated and the SCG bearer is maintained, as described above with respect to 610. At 710, the UE 110 (and the network) maps new data to the SCG bearer 410. However, transmission on the SCG bearer 410 does not occur. At 715, the UE 110 (and the network) determines whether the predetermined criteria described above has been met. If the predetermined criteria has not been met, the method 700 returns to 710, where the UE 110 continues to map new data to the SCG bearer 410. However, if the predetermined criteria has been met, then, at 720, the UE 110 requests that the network reactivate the SCG. At 725, the UE 110 (and the network 100) resumes transmissions on the SCG bearer 410. It should be noted that the operations of method 700 may be performed by the UE 110, as explained above, or by the network 120 (e.g., gNB 120A). However, if the network 120 performs the operations of the method 700, the network 120 may autonomously reactivate the SCG at 720 without a request from the UE 110 (assuming the predetermined criteria has been met).

Figure 8:
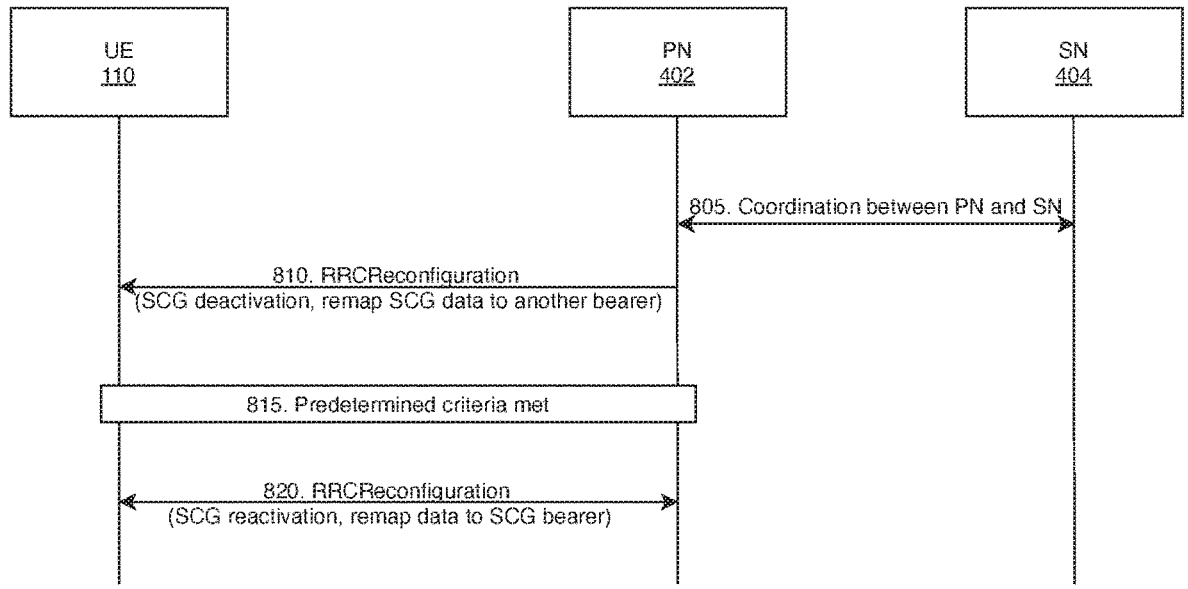
FIG. 8 shows a signaling diagram for deactivation and activation of an SCG according to various exemplary embodiments.

FIG. 8 shows a signaling diagram for deactivation and activation of an SCG according to various exemplary embodiments. At 805, coordination between the PN 402 and the SN 404 occurs. At 810, the PN 402 transmits an RRCReconfiguration message to the UE 110 to indicate to the UE 110 that (i) the SCG has been deactivated and (ii) the SCG data should be remapped to another bearer. In some embodiments, the other bearer to which the SCG data is remapped is the PCG bearer 406. This remapping may be performed in a similar manner as defined in Table A-1 of 3GPP 37.340 for layer 2 handling of bearer type change.

In some embodiments, the other bearer to which the SCG data is remapped may alternatively be the split bearer 408. In such an embodiment, the PDCP of the SCG (e.g., NR PDCP 412*f*) is reconfigured to reconfigure its associated RLC layer from the SCG RLC (e.g., SN RLC 414*h*) to both the PCG RLC (e.g., RLC 414*d*) and the SCG RLC. Since suspension of the SCG means that the SCG RLC is also suspended, then the primary path is the PCG RLC. In some embodiments, the primary path may alternatively be explicitly configured by the network. In some embodiments, the ul-DataSplitThreshold field of the RRC reconfiguration message may be defined as infinity to indicate to the UE 110 that all of the UL data should be directed to the primary leg of the split bearer (the PCG RLC). In some embodiments, the termination point (PN or SN) of the remapped SCG bearer may be changed.

At 815, a predetermined criteria for SCG reactivation is met. On the network side, in some embodiments, the predetermined criteria may be a threshold for the total amount of new downlink data accumulated on all split bearers. In some embodiments, the predetermined criteria may alternatively be a threshold for the amount of new downlink data on any split bearer. On the UE side, in some embodiments, the predetermined criteria may be a threshold for the total amount of new uplink data accumulated on all split bearers. In some embodiments, the predetermined criteria may alternatively be a threshold for the amount of new uplink data on any split bearer.

At 820, the PN transmits an RRCReconfiguration message to the UE 110 to indicate to the UE 110 that (i) the SCG has been reactivated and (ii) the other bearer should be remapped back to the SCG bearer 410.

Figure 9:
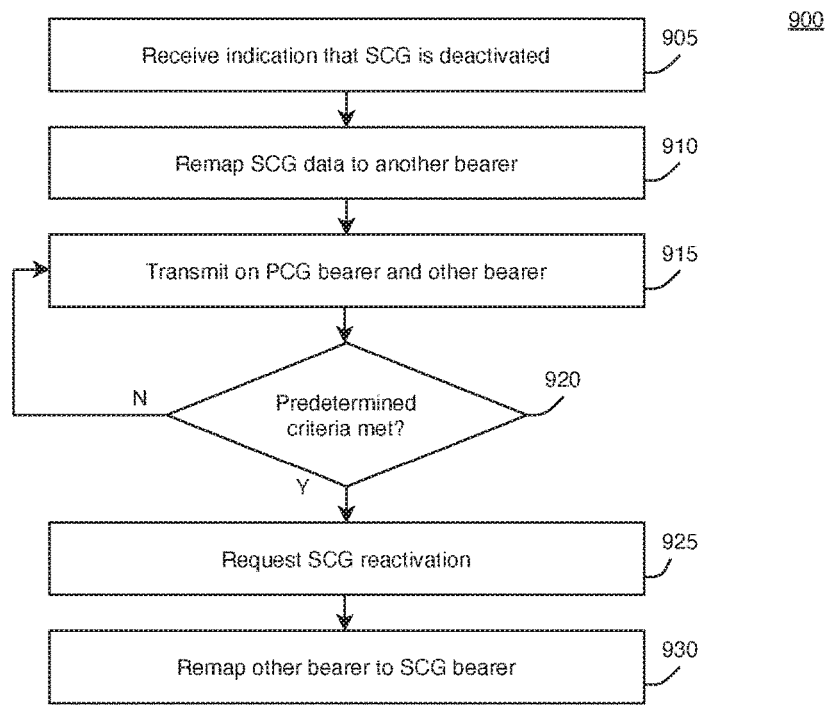
FIG. 9 shows a method of handling an SCG bearer upon deactivation of the SCG according to various exemplary embodiments.

FIG. 9 shows a method 900 of handling the SCG bearer 410 upon deactivation of the SCG according to various exemplary embodiments. The method 900 relates to the signaling diagram of FIG. 8. As such, a description of elements described above with respect to FIG. 8 will be omitted here. At 905, the UE 110 receives an indication from the network 120 that the SCG has been deactivated. At 910, the SCG bearer 410 is remapped to another bearer. As noted above, in some embodiments, the other bearer to which the SCG bearer 410 is remapped is the PCG bearer 406. In some embodiments, the other bearer may alternatively be the split bearer 408. At 915, all transmissions are sent over the PCG bearer 406 and the other bearer.

At 920, the UE 110 (or the network 120) determines whether the predetermined criteria has been met. If the predetermined criteria has not been met, the method 900 returns to 915 where transmission continues over the PCG bearer 406 and the other bearer. If, however, the predetermined criteria has been met, the SCG is reactivated. If the UE determines the predetermined criteria has been met, then at 925, the UE 110 transmits a request to the network 120 to reactivate the SCG. At 930, the other bearer is remapped back to the SCG bearer. It should be noted that the operations of method 900 may be performed by the UE 110, as explained above, or by the network 120 (e.g., gNB 120A). However, if the network 120 performs the operations of the method 900, the network 120 may autonomously reactivate the SCG at 925 without a request from the UE 110 (assuming the predetermined criteria has been met).

Figure 10:
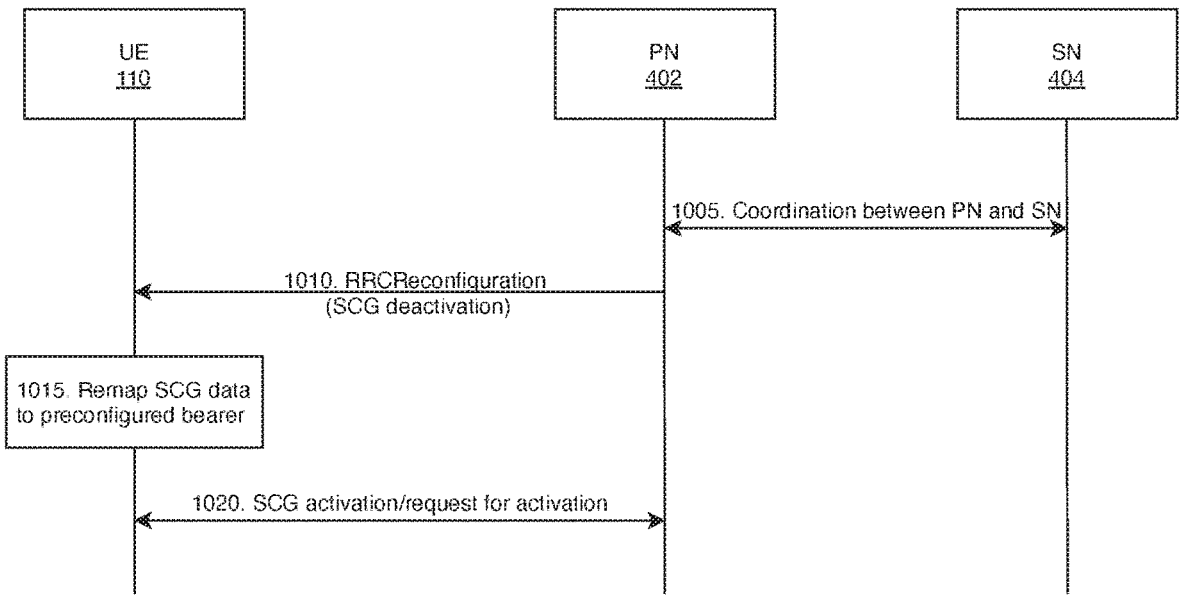
FIG. 10 shows a signaling diagram for deactivation and activation of an SCG according to various exemplary embodiments.

FIG. 10 shows a signaling diagram for deactivation and activation of an SCG according to various exemplary embodiments. At 1005, coordination between the PN 402 and the SN 404 occurs. At 810, the PN 402 transmits an RRCReconfiguration message to the UE 110 to indicate to the UE 110 that the SCG has been deactivated. At 1015, the UE 110 remaps the SCG data to a preconfigured bearer. In some embodiments, the preconfigured bearer is a PCG default bearer which the UE 110 is configured to use if data traffic cannot be mapped to any other bearer. In some embodiments, the preconfigured bearer may alternatively be a backup PCG bearer. In such an embodiment, the network may pre-configure the UE 110 with an association between the SCG bearer 410 and the backup PCG bearer. At 1020, the UE 110 requests the reactivation of and/or the network reactivates the SCG.

Figure 11:
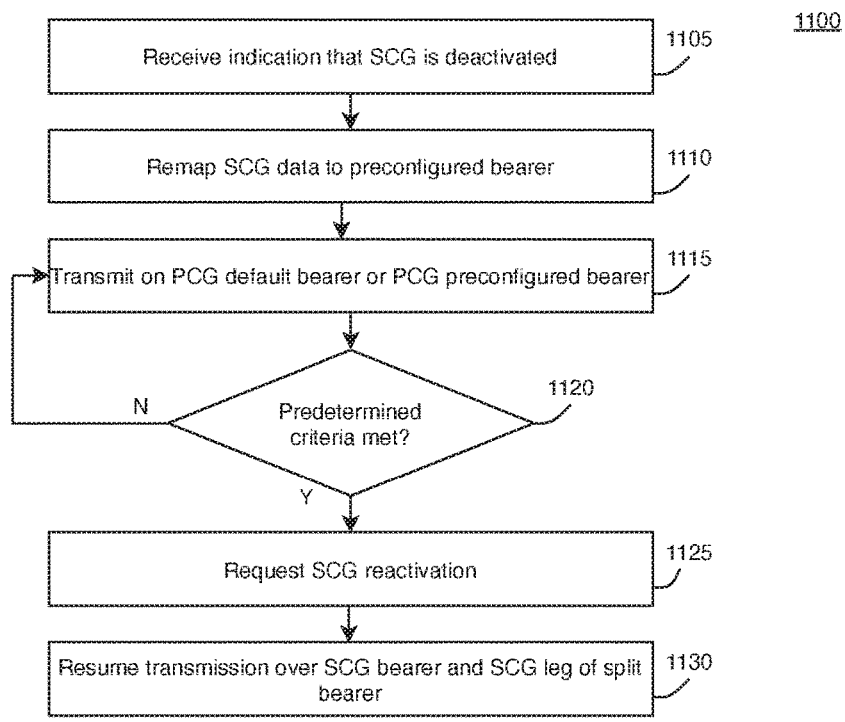
FIG. 11 shows a method of handling an SCG bearer deactivation according to various exemplary embodiments.

FIG. 11 shows a method 1100 of handling an SCG bearer deactivation according to various exemplary embodiments. The method 1100 relates to the signaling diagram of FIG. 10. As such, a description of elements described above with respect to FIG. 10 will be omitted here. At 1105, the UE 110 receives an indication from the network 120 that the SCG has been deactivated. At 1110, the SCG bearer 410 is remapped to a preconfigured bearer. As noted above, in some embodiments, the preconfigured bearer to which the SCG bearer 410 is remapped is the PCG default bearer. In some embodiments, the preconfigured bearer may alternatively be the backup PCG bearer. At 1115, all transmissions are sent over the PCG bearer 406 and the preconfigured bearer.

In some embodiments, the UE 110 (or the network 120) determines whether a predetermined criteria for reactivation of the SCG has been met at 1120. If the predetermined criteria has not been met, the method 1100 returns to 1115, where transmission continues over the PCG bearer and the preconfigured bearer. If, however, the predetermined criteria has been met, then, at 1125, the UE 110 requests reactivation of the SCG. At 1130, the UE 110 resumes transmission over the SCG bearer 410 and the SCG leg of the split bearer 408. It should be noted that the operations of method 1100 may be performed by the UE 110, as explained above, or by the network 120 (e.g., gNB 120A). However, if the network 120 performs the operations of the method 1100, the network 120 may autonomously reactivate the SCG at 1125 without a request from the UE 110 (assuming the predetermined criteria has been met).

EXAMPLES

In a first example, a processor of a user equipment (UE) configured to perform operations comprising receiving, from a base station of a wireless network, a deactivation indication indicating that a secondary cell group (SCG) of a dual connectivity (DC) wireless communications configuration has been deactivated, ceasing transmission over an SCG leg of a split bearer, transmitting only on a primary cell group (PCG) leg of the split bearer and a PCG bearer; mapping new data only to the PCG leg of the split bearer; and determining if a predetermined criteria for reactivation of the SCG has been met.

In a second example, the processor of the first example, wherein the predetermined criteria is a new data amount threshold corresponding to each of one or more split bearers.

In a third example, the processor of the first example, wherein the predetermined criteria is a new total data amount threshold corresponding to all of one or more split bearers.

In a fourth example, the processor of the first example, wherein, when the predetermined criteria is met, the UE transmits a request to the base station to reactivate the SCG.

In a fifth example, the processor of the fourth example, wherein the operations further comprise receiving an indication from the base station that the SCG has been reactivated, wherein the indication further includes an indication of which leg of the split bearer is a primary leg.

In a sixth example, a processor of a user equipment (UE) configured to perform operations comprising receiving, from a base station of a wireless network, a deactivation indication indicating that (i) a secondary cell group (SCG) of a dual connectivity (DC) wireless communications configuration has been deactivated, and (ii) new data generation for an SCG bearer should resume, ceasing transmission over the SCG bearer and an SCG leg of a split bearer, mapping new data to the SCG bearer; and determining if a predetermined criteria for reactivation of the SCG has been met.

In a seventh example, the processor of the sixth example, wherein the predetermined criteria is a new total data amount threshold corresponding to all of one or more SCG bearers.

In a eighth example, the processor of the sixth example, wherein the predetermined criteria is a new data amount threshold corresponding to any one of one or more SCG bearers.

In a ninth example, the processor of the sixth example, wherein the predetermined criteria is expiration of a timer.

In a tenth example, the processor of the sixth example, wherein, when the predetermined criteria is met, the UE transmits a request to the base station to reactivate the SCG.

In an eleventh example, the processor of the tenth example, wherein the operations further comprise receiving an indication from the base station that the SCG has been reactivated; and transmitting data mapped to the SCG bearer over the SCG bearer.

In a twelfth example, a processor of a user equipment (UE) configured to perform operations comprising receiving, from a base station of a wireless network, a deactivation indication indicating that a secondary cell group (SCG) of a dual connectivity (DC) wireless communications configuration has been deactivated; transmitting data associated with an SCG bearer on a preconfigured bearer; and mapping new data to the preconfigured data.

In a thirteenth example, the processor of the twelfth example, wherein the preconfigured bearer is a default primary cell group (PCG) bearer on which data that cannot be mapped to any other bearer is transmitted.

In a fourteenth example, the processor of the twelfth example, wherein the preconfigured bearer is a primary cell group (PCG) bearer which the base station preconfigures the UE to use upon deactivation of the SCG bearer.

In a fifteenth example, the processor of the twelfth example, wherein the operations further comprise receiving an indication from the base station that the SCG has been reactivated, and resuming transmissions on the SCG bearer.

In a sixteenth example, a user equipment (UE) comprising a transceiver configured to communicate with a network, and a processor communicatively coupled to the transceiver and configured to perform operations comprising receiving, from a base station of the network, a deactivation indication indicating that a secondary cell group (SCG) of a dual connectivity (DC) wireless communications configuration has been deactivated, receiving, from the base station, a remapping indication indicating that SCG data originally mapped to an SCG bearer should be remapped to an alternate bearer, remapping the SCG data to the alternate bearer based on the remapping indication, and transmitting data over the alternate bearer.

In a seventeenth example, the UE of the sixteenth example, wherein the deactivation indication and the remapping indication are received in a single transmission.

In an eighteenth example, the UE of the seventeenth example wherein the single transmission is a radio resource control (RRC) reconfiguration message.

In a nineteenth example, the UE of the eighteenth example, wherein the alternate bearer is a primary cell group (PCG) bearer.

In a twentieth example, the UE of the eighteenth example, wherein the alternate bearer is a split bearer.

In a twenty-first example, the UE of the twentieth example, wherein an SCG packet data convergence protocol (PDCP) is reconfigured to reconfigure a corresponding radio link control (RLC) layer from an SCG RLC to both a PCG RLC and the SCG RLC.

In a twenty-second example, the UE of the twenty-first example, wherein a primary path corresponds to the PCG RLC.

In a twenty-third example, the UE of the twenty-first example, wherein a value of a ul-DataSplitThreshold field of the RRC reconfiguration message is infinity.

In a twenty-fourth example, the UE of the twentieth example, wherein the operations further comprise determining that a predetermined criteria for reactivation of the SCG has been met, and transmitting a request to reactivate the SCG to the base station.

In a twenty-fifth example, the UE of the twenty-fourth example, wherein the predetermined criteria is a new data amount threshold corresponding to each of one or more split bearers.

In a twenty-sixth example, the UE of the twenty-fourth example, wherein the predetermined criteria is a new total data amount threshold corresponding to all of one or more split bearers.

In a twenty-seventh example, the UE of the twenty-fourth example, wherein the operations further comprise receiving a second RRC reconfiguration message indicating that the SCG has been reactivated and that transmissions may resume on the SCG bearer and an SCG leg of the split bearer.

In a twenty-eighth example, the UE of the twenty-seventh example, wherein the second RRC reconfiguration message configures a remapping of the split bearer back to the SCG bearer.

In a twenty-ninth example, a base station comprising a transceiver configured to communicate with a user equipment (UE), and a processor communicatively coupled to the transceiver and configured to perform operations comprising transmitting, to the UE, a deactivation indication indicating that a secondary cell group (SCG) of a dual connectivity (DC) wireless communications configuration has been deactivated, transmitting, to the UE, a remapping indication indicating that SCG data originally mapped to an SCG bearer should be remapped to an alternate bearer, remapping the SCG data to the alternate bearer, and transmitting data over the alternate bearer.

In a thirtieth example, the base station of the twenty-ninth example, wherein the deactivation indication and the remapping indication are transmitted in a single transmission.

In a thirty-first example, the base station of the thirtieth example, wherein the single transmission is a radio resource control (RRC) reconfiguration message.

In a thirty-second example, the base station of the thirty-first example, wherein the alternate bearer is a primary cell group (PCG) bearer.

In a thirty-third example, the base station of the thirty-first example, wherein the alternate bearer is a split bearer.

In a thirty-fourth example, the base station of the thirty-third example, wherein the operations further comprise reconfiguring an SCG packet data convergence protocol (PDCP) to reconfigure a corresponding radio link control (RLC) layer from an SCG RLC to both a PCG RLC and the SCG RLC.

In a thirty-fifth example, the base station of the thirty-fourth example, wherein a primary path corresponds to the PCG RLC.

In a thirty-sixth example, the base station of the thirty-fourth example, wherein a value of a ul-DataSplitThreshold field of the RRC reconfiguration message is infinity.

In a thirty-seventh example, the base station of the thirty-third example, wherein the operations further comprise determining that a predetermined criteria for reactivation of the SCG has been met, and reactivating the SCG.

In a thirty-eighth example, the base station of the thirty-seventh example, wherein the predetermined criteria is a new data amount threshold corresponding to each of one or more split bearers.

In a thirty-ninth example, the base station of the thirty-seventh example, wherein the predetermined criteria is a new total data amount threshold corresponding to all of one or more split bearers.

In a fortieth example, the base station of the thirty-seventh example, wherein the operations further comprise transmitting a second RRC reconfiguration message to the UE indicating that the SCG has been reactivated and that transmissions may resume on the SCG bearer and an SCG leg of the split bearer.

In a forty-first example, the base station of the fortieth example, wherein the second RRC reconfiguration message configures a remapping of the split bearer back to the SCG bearer.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

receiving, from a base station of a wireless network in a single radio resource control (RRC) reconfiguration message, (i) a deactivation indication indicating that a secondary cell group (SCG) of a dual connectivity (DC) wireless communications configuration has been deactivated and (ii) a remapping indication indicating that SCG data originally mapped to an SCG bearer is to be remapped to a split bearer;

remapping the SCG data to the split bearer based on the remapping indication; and transmitting data over the split-bearer.

2. The processor of claim 1, wherein an SCG packet data convergence protocol (PDCP) is reconfigured to reconfigure a corresponding radio link control RLC) layer from an SCG RLC to both a PCG RLC and the SCG RLC.

3. The processor of claim 2, wherein a primary path corresponds to the PCG RLC.

4. The processor of claim 2, wherein a value of a ul-DataSplitThreshold field of the RRC reconfiguration message is infinity.

5. The processor of claim 1, wherein the operations further comprise:
determining that a predetermined criteria for reactivation of the SCG has been met; and
transmitting a request to reactivate the SCG to the base station.

6. The processor of claim 5, wherein the operations further comprise:
receiving a second RRC reconfiguration message indicating that the SCG has been reactivated and that transmissions are to resume on the SCG bearer and an SCG leg of the split bearer.

7. The processor of claim 6, wherein the second RRC reconfiguration message configures a remapping of the split bearer back to the SCG bearer.

8. The processor of claim 5, wherein the predetermined criteria is a new data amount threshold corresponding to each of one or more split bearers.

9. The processor of claim 5, wherein the predetermined criteria is a new total data amount threshold corresponding to all of one or more split bearers.

10. A processor of a base station configured to perform operations comprising:

transmitting, to a user equipment (UE), in a single radio resource control (RRC) configuration message, (i) a deactivation indication indicating that a secondary cell group (SCG) of a dual connectivity (DC) wireless communications configuration has been deactivated and (ii) a remapping indication indicating that SCG data originally mapped to an SCG bearer is to be remapped to a split bearer;

remapping the SCG data to the split bearer; and transmitting data over the split bearer.

11. The processor of claim 10, wherein the operations further comprise:
reconfiguring an SCG packet data convergence protocol (PDCP) to reconfigure a corresponding radio link control (RLC) layer from an SCG RLC to both a PCG RLC and the SCG RLC.

12. The processor of claim 11, wherein a primary path corresponds to the PCG RLC.

13. The processor of claim 11, wherein a value of a ul-DataSplitThreshold field of the RRC reconfiguration message is infinity.

14. The processor of claim 10, wherein the operations further comprise:
determining that a predetermined criteria for reactivation of the SCG has been met; and
reactivating the SCG.

15. The processor of claim 14, wherein the predetermined criteria is a new data amount threshold corresponding to each of one or more split bearers.

16. The processor of claim 14, wherein the predetermined criteria is a new total data amount threshold corresponding to all of one or more split bearers.

17. The processor of claim 14, wherein the operations further comprise:
transmitting a second RRC reconfiguration message to the UE indicating that the SCG has been reactivated and that transmissions are to resume on the SCG bearer and an SCG leg of the split bearer, wherein the second RRC reconfiguration message configures a remapping of the split bearer back to the SCG bearer.

18. The processor of claim 17, wherein the second RRC reconfiguration message configures a remapping of the split bearer back to the SCG bearer.

* * * * *